(12) United States Patent
Chen

(10) Patent No.: US 12,742,092 B2
(45) Date of Patent: Sep. 22, 2026

(54) MATTE RESIN COMPOSITION, PREPARATION METHOD THEREOF, MATTE FILM AND ARTIFICIAL NAIL

(71) Applicant: ZHONGSHAN SENBOMA ARTWARE CO., LTD, Zhongshan (CN)

(72) Inventor: Yong Chen, Xinyang (CN)

(73) Assignee: ZHONGSHAN SENBOMA ARTWARE CO., LTD, Zhongshan (CN)

( * ) Notice: Subject to any disclaimer, the term of this patent is extended or adjusted under 35 U.S.C. 154(b) by 291 days.

(21) Appl. No.: 18/286,108

(22) PCT Filed: Aug. 26, 2022

(86) PCT No.: PCT/CN2022/115135
§ 371 (c)(1),
(2) Date: Oct. 7, 2023

(87) PCT Pub. No.: WO2023/245860
PCT Pub. Date: Dec. 28, 2023

(65) Prior Publication Data

US 2025/0084277 A1 Mar. 13, 2025

(30) Foreign Application Priority Data

Jun. 24, 2022 (CN) ......................... 202210730973.5

(51) Int. Cl.
*C09D 175/14* (2006.01)
*A45D 31/00* (2006.01)
*C09D 7/42* (2018.01)

(52) U.S. Cl.
CPC ........... *C09D 175/14* (2013.01); *A45D 31/00* (2013.01); *C09D 7/42* (2018.01)

(58) Field of Classification Search
CPC ......... C09D 175/14; C09D 7/42; A45D 31/00
See application file for complete search history.

(56) References Cited

U.S. PATENT DOCUMENTS 6,051,242 A * 4/2000 Patel ........................ A61K 8/35 424/61
2019/0314264 A1* 10/2019 Saito ......................... C08F 2/48
2021/0115178 A1* 4/2021 Seo ................... C08F 220/1811
2023/0148731 A1* 5/2023 Woo ..................... C09D 175/04 424/61

FOREIGN PATENT DOCUMENTS

CN 110072514 A 7/2019
CN 113004855 A * 6/2021 ............... A61Q 3/00
JP 2017141177 A 8/2017

OTHER PUBLICATIONS

CN113004855A—Machine translation, 2025, pp. 1-20 (Year: 2025).*
International Search Report of PCT Patent Application No. PCT/CN2022/115135 issued on Feb. 28, 2023.

* cited by examiner

*Primary Examiner* — Andrew S Rosenthal

(57) ABSTRACT

The present disclosure provides a matte resin composition, a preparation method thereof, a matte film, and an artificial nail. The matte resin composition comprises: a photoinitiator, a matting agent, an optional diluent, an optional corrosive agent, and polyurethane (methyl) acrylate, where a monomer of the polyurethane (methyl) acrylate has a functionality between 2 and 6; and/or the polyurethane (methyl) acrylate has a molecular weight between 1000 and 2000 Da. The matte resin composition disclosed herein exhibits excellent matting effect and may achieve such matting effect without coating additional substances. Moreover, the matte resin composition disclosed herein demonstrates high adhesion force without polishing during usage.

9 Claims, 1 Drawing Sheet

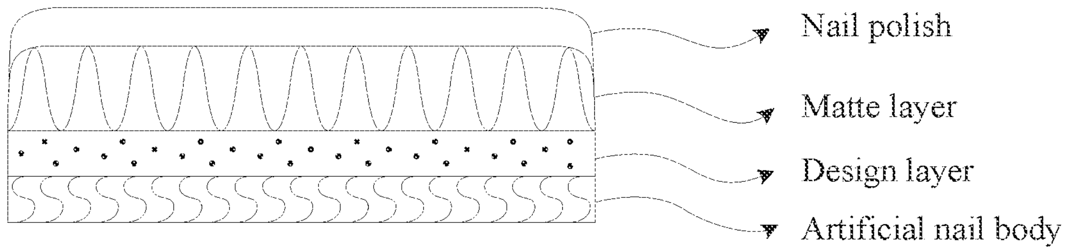
Nail polish
Matte layer
Design layer
Artificial nail body

MATTE RESIN COMPOSITION, PREPARATION METHOD THEREOF, MATTE FILM AND ARTIFICIAL NAIL

TECHNICAL FIELD

The present disclosure relates to a matte resin composition, a preparation method thereof, a matte film and an artificial nail, which belongs to the field of artificial nails.

BACKGROUND

Nail makeup materials and nail technology using the nail makeup materials are developing rapidly with the increasing popularity of nail art such as decorating small artificial gems, drawing patterns, affixing decorations and artificial nails on nails (fingernails). Previous nail makeup materials are represented by nail polishes and glazes composed of nitrocellulose, alkyd resin and solvents such as ethyl acetate or butyl acetate, which are overlapped three layers on the nail surface in an order of base coat (priming layer), colored nail polish (middle layer), topcoat (top layer) to form a coating film. However, the use of organic solvents has several disadvantages, such as prolonged drying time, difficulty in drying inside and difficulty in thickly coating. In addition, organic solvents such as acetone, ethyl acetate and butyl acetate are used as a peeling agent in the peeling process (cleaning) of the coating film associated with the growth of nails, which may cause health damage such as organic solvents poisoning by direct inhalation and absorption through the skin.

After pasting the artificial nail body on the customer's nails, the manicurist needs to polish the surface of the artificial nail body and then applies glue on the polished surface of the artificial nail body. After gluing, painting and other operations may be performed. The role of polishing is to improve the adhesion force of the artificial nail body and the glue layer thereon. In prior art, the surface of the artificial nail body is glossy. In order to improve the adhesion force, patterns are generally set on the production mold. However, the artificial nail body with a glossy surface generally has the following two defects: 1. low efficiency of manual polishing: 2. producing powder during manual polishing, which pollutes the environment.

Therefore, the search of a matte artificial nail body has become an urgent technical problem.

SUMMARY

Technical Problem

In view of the technical problems existing in prior art, the present disclosure provides a matte resin composition. The matte resin composition disclosed herein exhibits excellent matting effect and may achieve such matting effect without coating additional substances. Moreover, the matte resin composition disclosed herein demonstrates high adhesion force without polishing during usage.

Furthermore, the present disclosure also provides a preparation method of the matte resin composition, the preparation method is simple and can be easily implemented, and raw materials are easy to obtain.

Furthermore, the present disclosure also provides an artificial nail, which comprises a matte layer. The matte layer has an improved adhesion force, making nail polish difficult to fall off and peel. Consumers may finish manicure without polishing and coating an adhesive layer.

Technical Solutions

[1]. A matte resin composition, comprising:
- a photoinitiator,
- a matting agent,
- an optional diluent,
- an optional corrosive agent, and
- polyurethane (methyl) acrylate, wherein
- a monomer of the polyurethane (methyl) acrylate has a functionality between 2 and 6; and/or the polyurethane (methyl) acrylate has a molecular weight between 1000 and 2000 Da.

[2] The matte resin composition according to the above [1], wherein the polyurethane (methyl) acrylate has a viscosity between 290 and 400 cps/30° C., and an acid value of less than 5 mg KOH/g.

[3] The matte resin composition according to the above [1] or [2], wherein a content of the photoinitiator is from 0.1% to 8%; a content of the matting agent is from 0.5% to 3%; a content of the diluent is from 5% to 20%; a content of the corrosive agent is from 0.1% to 1%, based on a total mass of the polyurethane (methyl) acrylate of 100%.

[4] The matte resin composition according to any one of the above [1] to [3], wherein the resin composition also comprises an acrylic monomer, and a content of the acrylic monomer is from 3% to 25%, based on a total mass of the polyurethane (methyl) acrylate of 100%.

[5] The matte resin composition according to the above [4], wherein the acrylic monomer is one or a combination of two or more selected from structures shown in formulas (I) and (II) below:

(I)

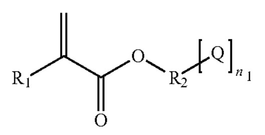

(II)

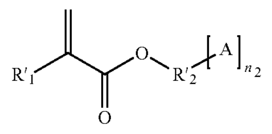

- wherein $R_1$ and $R'_1$ each independently represents H or methyl group;
- $R_2$ and $R'_2$ each independently represents a single bond, or an alkylene group with 1 to 6 carbon atoms that is unsubstituted or substituted with one or more substituent(s);
- Q represents a bridged cyclic hydrocarbyl group that is unsubstituted or substituted with one or more substituent(s), the bridged cyclic hydrocarbyl group has at least two rings, and the number of carbon atoms in each of the at least two rings is from 3 to 8;
- A represents a monoheterocyclic group that is unsubstituted or substituted with one or more substituent(s), the monoheterocyclic group comprises at least one heteroatom, the heteroatom is at least one of S atom, O atom and N atom;
- $n_1$ represents an integer between 1 and 3, and $n_2$ represents an integer between 1 and 3.

[6] The matte resin composition according to the above [5], wherein a content of the acrylic monomer having the structure shown in formula (I) is from 1% to 12%, the acrylic monomer having the structure shown in formula (II) is from 2% to 13%, based on a total mass of the polyurethane (methyl) acrylate of 100%.

[7] A preparation method of the matte resin composition according to any one of the above [1] to [6], comprising a step of mixing all components of the matte resin composition.

[8] A matte film, comprising the matte resin composition according to any one of the above [1] to [6].

[9] An artificial nail, comprising a matte layer, the matte layer is the matte film according to the above [8].

[10] The artificial nail according to the above [9], wherein the artificial nail comprises:

an artificial nail body, an optional design layer in contact with the artificial nail body; and a matte layer in contact with the design layer or the artificial nail body.

Effect of Invention

The matte resin composition disclosed herein exhibits excellent matting effect and may achieve such matting effect without coating additional substances. Moreover, the matte resin composition disclosed herein demonstrates high adhesion force without polishing during usage.

Furthermore, the preparation method of the matte resin composition disclosed herein is simple and can be easily implemented, raw materials are easy to obtain, and suitable for large-scale production.

Furthermore, the artificial nail disclosed herein contains a matte layer. The matte layer has an improved adhesion force, making nail polish difficult to fall off and peel. Consumers may finish manicure without polishing and coating an adhesive layer.

BRIEF DESCRIPTION OF THE DRAWINGS

The sole FIGURE shows the section structure of the artificial nail in one embodiment of the present disclosure.

DETAILED DESCRIPTION

The various exemplary embodiments, characteristics and aspects of the present disclosure are described in detail below. The special word "exemplary" herein means "to serve as an example, an embodiment, or illustrative". Any embodiment described herein as "exemplary" should not be construed as superior to or better than other embodiments.

In addition, in order to better illustrate the present disclosure, lots of specific details are given in the specific embodiments below. Those skilled in the art should understand that the present disclosure may be implemented without certain specific details. In other instances, methods, means, equipments and procedures that are well known to those skilled in the art are not described in detail in order to highlight the main thrust of the present disclosure.

In this specification, "(methyl) acrylate" used herein comprises the meaning of "acrylate" and "methyl acrylate": "(methyl) acrylic acid" used herein comprises the meaning of "acrylic acid" and "methyl acrylic acid".

Unless otherwise stated, all units used in this specification are international standard units, and the values and ranges shown in the present disclosure should be understood to comprise systematic errors that are unavoidable in industrial production.

In this specification, "%" refers to the percentage of mass content unless otherwise stated.

In this specification, the use of "may" indicates the meaning of a certain processing and not to perform a certain processing.

In this specification, references to "some specific/preferred embodiments, "other specific/preferred embodiments", "embodiment(s)", etc., mean that the specific elements (e.g., characteristics, structures, force and/or characteristics) described in relation to the embodiment are comprised in at least one of embodiments described herein, and they may or may not exist in other embodiments. In addition, it should be understood that elements may be combined in any appropriate manner in various embodiments.

In this specification, the value range represented by "value A to value B" refers to the range from value A to value B.

<The First Aspect>

The first aspect of the present disclosure provides a matte resin composition, comprising:

a photoinitiator, a matting agent, an optional diluent, an optional corrosive agent, and polyurethane (methyl) acrylate, wherein a monomer of the polyurethane (methyl) acrylate has a functionality between 2 and 6; and/or the polyurethane (methyl) acrylate has a molecular weight between 1000 and 2000 Da.

The matte resin composition disclosed herein exhibits excellent matting effect and may achieve such matting effect without coating additional substances. Moreover, the matte resin composition disclosed herein demonstrates high adhesion force without polishing during usage.

Polyurethane (Methyl) Acrylate

The substrate of the matte resin composition disclosed herein is a polyurethane (methyl) acrylate. The polyurethane (methyl) acrylate of the present disclosure has a functionality between 2 and 6; and/or, the polyurethane (methyl) acrylate has a molecular weight between 1000 and 2000 Da. The polyurethane (methyl) acrylate has desirable adhesion force, optimal storage stability, and parts thereof may be cured by moisture at room temperature.

Further, in some specific embodiments, the polyurethane (methyl) acrylate has a viscosity between 290 and 400 cps/30° C. and an acid value of less than 5 mg KOH/g.

Acrylic Monomer

In the present disclosure, the resin composition also comprises an acrylic monomer, and a content of the acrylic monomer is from 3% to 25%, such as 4%, 6%, 8%, 10%, 12%, 14%, 16%, 18%, 20%, 22%, 24%, etc., based on a total mass of the polyurethane (methyl) acrylate of 100%.

In some specific embodiments, acrylic monomers having the structure shown in formula (I) may be added to further increase the adhesion force between the design layer (or artificial nail body) and the matte layer, and between the matte layer and the nail polish. Additionally, the acrylic monomers having the structure shown in formula (I) may result in a harder film formed by the matte layer.

The acrylic monomers disclosed herein comprise one or a combination of two or more of the compounds having the structure shown in formula (I) below, (I)

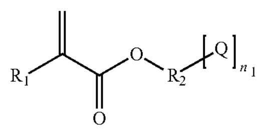

wherein $R_1$ represents H or methyl;

$R_2$ represents a single bond, or an alkylene group with 1 to 6 carbon atoms, preferably with 1 to 5 carbon atoms, that is unsubstituted or substituted with one or more substituent(s). As for the substituent, it is not specially restricted in the present disclosure, and may be any substituent practicable in the field. For example, the substituent may be an inorganic group or an organic group with 1 to 6 carbon atoms. Preferably, the inorganic group may be halogen, amino group, hydroxyl group, phosphate group, phosphonic acid group, metaphosphate group, nitro group, sulfuric acid group, sulfonic acid group, cyanide, thiocyanyl, sulfhydryl group, carbonate group, phosphine group, etc. The organic group may be alkyl, alkoxy, carboxyl, carboxyl alkoxy, carbonate, alkyl ether, alkyl ester, thioether, thioester, aldehyde, carbamate, urea, amide, imide, cycloalkyl, heterocyclic, etc. All alkyl groups may be straight chain alkyl or branched chain alkyl with 1 to 6 carbon atoms. All alkoxy groups may be straight-chain alkoxy or branched alkoxy group with 1 to 6 carbon atoms, and a cycloalkyl group may be a cycloalkyl group with 3 to 10 carbon atoms. Preferably, the halogen may be F, Cl, or Br atom.

Q represents a bridged cyclic hydrocarbyl group that is unsubstituted or substituted with one or more substituent(s), the bridged cyclic hydrocarbyl group has at least two rings, preferred 2 to 6 rings, and the number of carbon atoms in each of the at least two rings is from 3 to 8; wherein, for the number of rings, it may be 2, 3, 4, 5, etc.; and the number of carbon atoms in each of the at least two rings may be 3, 4, 5, 6, 7, 8, etc. As for the substituent, it is not specially restricted in the present disclosure, and may be any substituent practicable in the field. For example, the substituent may be an inorganic group or an organic group with 1 to 6 carbon atoms. Preferably, the inorganic group may be halogen, amino group, hydroxyl group, phosphate group, phosphonic acid group, metaphosphate group, nitro group, sulfuric acid group, sulfonic acid group, cyanide, thiocyanyl, sulfhydryl group, carbonate group, phosphine group, etc. The organic group may be alkyl, alkoxy, carboxyl, carboxyl alkoxy, carbonate, alkyl ether, alkyl ester, thioether, thioester, aldehyde, carbamate, urea, amide, imide, etc. All alkyl groups may be straight chain alkyl or branched chain alkyl with 1 to 6 carbon atoms. All alkoxy groups may be straight-chain alkoxy or branched alkoxy groups with 1 to 6 carbon atoms. Preferably, the halogen may be F, Cl, or Br atom.

$n_1$ is an integer between 1 and 3.

In a further preferred embodiment, a compound having the structure shown in formula (I) suitable in the present disclosure may be isobornyl (methyl) acrylate, etc.

In other specific embodiments, acrylic monomers having the structure shown in formula (II) may be added to further increase the adhesion force between the design layer (or artificial nail body) and the matte layer, and between the matte layer and the nail polish. Additionally, the acrylic monomers having the structure shown in formula (I) may result in a softer film formed by the matte layer.

The acrylic monomers disclosed herein comprise one or a combination of two or more of the compounds having the structure shown in formula (II) below, (2)

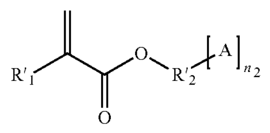

wherein $R'_1$ represents H or methyl;

$R'_2$ represents a single bond, or a substituted by substituent(s) or non-substituted alkylene group with 1 to 6 carbon atoms, preferably with 1 to 5 carbon atoms. Similarly, as for the substituent, it is not specially restricted in the present disclosure, and may be any substituent practicable in the field. For example, the substituent may be an inorganic group or an organic group with 1 to 6 carbon atoms. Preferably, the inorganic group may be halogen, amino group, hydroxyl group, phosphate group, phosphonic acid group, metaphosphate group, nitro group, sulfuric acid group, sulfonic acid group, cyanide, thiocyanyl, sulfhydryl group, carbonate group, phosphine group, etc. The organic group may be alkyl, alkoxy, carboxyl, carboxyl alkoxy, carbonate, alkyl ether, alkyl ester, thioether, thioester, aldehyde, carbamate, urea, amide, imide, cycloalkyl, heterocyclic, etc. All alkyl groups may be straight chain alkyl or branched chain alkyl with 1 to 6 carbon atoms. All alkoxy groups may be straight-chain alkoxy or branched alkoxy group with 1 to 6 carbon atoms, and a cycloalkyl group may be a cycloalkyl group with 3 to 10 carbon atoms. Preferably, the halogen may be F, Cl, or Br atom.

A represents a monoheterocyclic group that is unsubstituted or substituted with one or more substituent(s), the monoheterocyclic group comprises at least one heteroatom, the heteroatom is at least one of S atom, O atom and N atom: in each monoheterocyclic group, the number of carbon atoms is 4 to 5. As for the substituent, it is not specially restricted in the present disclosure, and may be any substituent practicable in the field. For example, the substituent may be an inorganic group or an organic group with 1 to 6 carbon atoms. Preferably, the inorganic group may be halogen, amino group, hydroxyl group, phosphate group, phosphonic acid group, metaphosphate group, nitro group, sulfuric acid group, sulfonic acid group, cyanide, thiocyanyl, sulfhydryl group, carbonate group, phosphine group, etc. The organic group may be alkyl, alkoxy, carboxyl, carboxyl alkoxy, carbonate, alkyl ether, alkyl ester, thioether, thioester, aldehyde, carbamate, urea, amide, imide, etc. All alkyl groups may be straight chain alkyl or branched chain alkyl with 1 to 6 carbon atoms. All alkoxy groups may be straight-chain alkoxy or branched alkoxy groups with 1 to 6 carbon atoms. Preferably, the halogen may be F, Cl, or Br atom.

$n_2$ represents an integer between 1 and 3.

In a further preferred embodiment, a compound having the structure shown in formula (II) suitable in the present disclosure may be tetrahydrofuran (methyl) acrylate, etc.

In some specific embodiments, an acrylic monomer having the structure shown in formula (I) and an acrylic monomer having the structure shown in formula (II) are comprised in the present disclosure. In order to make the present disclosure have the best effect, a content of the acrylic monomer having the structure shown in formula (I) is from 1% to 12%, such as 2%, 3%, 4%, 5%, 6%, 7%, 8%, 9%, 10%, 11%, etc.; and a content of the acrylic monomer having the structure shown in formula (II) is from 2% to 13%, such as 3%, 4%, 5%, 6%, 7%, 8%, 9%, 10%, 11%, 12%, etc., based on a total mass of the polyurethane (methyl) acrylate of 100%.

Further, the acrylate monomer disclosed herein may contain other acrylic monomers other than the two acrylic monomers mentioned above.

Other acrylic monomers that may be listed are alkyl (methyl) acrylate, cycloalkyl (methyl) acrylate, and aryl (methyl) acrylate. As an alkyl (methyl) acrylate, for example, a (methyl) acrylate used to form a monomer unit of said acrylic polymer, that is, a (methyl) acrylate as a monomer of an acrylic polymer, a methyl ester, an ethyl ester, a propyl ester, an isopropyl ester, a butyl ester, an isobutyl ester, a sec-butyl ester, a tert-butyl ester, an amyl ester, an isoamyl ester, a hexyl ester, a heptyl ester, an octyl ester, a 2-ethyl hexyl ester, an isooctyl ester, a nonyl ester, a decyl ester, an isodecyl ester, an undecyl ester, a dodecyl ester, a tridecyl ester, a tetradecyl ester, a cetyl ester, an octadecyl ester, and an eicosyl ester of (methyl) acrylic acid may be listed. As a cycloalkyl (methyl) acrylate, for example, a cycloamyl ester and a cyclohexyl ester of (methyl) acrylic acid may be listed. As an aryl (methyl) acrylate, for example, a phenyl (methyl) acrylate and a benzyl (methyl) acrylate may be listed. For other acrylic monomers, one (methyl) acrylate or at least two (methyl) acrylates may be used.

Further, one or at least two other monomers that may be copolymerized with (methyl) acrylate may also be comprised as constituent monomers for purposes such as cohesion and heat resistance modification. As such a monomer, for example, a vinyl acetate monomer, an anhydride-containing monomer, an epoxy-containing monomer, a sulfonic-containing monomer, a phospho-containing monomer, an acrylamide, and an acrylonitrile may be listed. As an anhydride-containing monomer, for example, maleic anhydrides and iconic anhydrides may be listed. As an epoxy-containing monomer, for example, glycidyl (methyl) acrylate and methyl glycidyl (methyl) acrylate may be listed. As a sulfonic-containing monomer, for example, styrene sulfonic acid, allyl sulfonic acid, 2-(methyl) acrylamide-2-methylpropyl sulfonic acid, (methyl) acrylamide-propyl sulfonic acid, and (methyl) acryloxynaphthalene sulfonic acid may be listed. As a phospho-containing monomer, for example, 2-hydroxyethyl acrylyl phosphate may be listed.

Photoinitiator

The composition disclosed herein also comprises a photoinitiator. The photoinitiator is a compound that decompose and produce free radical species, cationic species or anionic species by irradiation of active energy rays such as ultraviolet or visible light. For a photoinitiator, it is not specially restricted, commonly used photoinitiator such as free radical photoinitiator may be used.

Specifically, the free radical photoinitiator may be listed as but is not limited to one or a combination of two or more of the following: 1-hydroxy-cyclohexyl-phenyl-ketone, diethoxy acetophenone, 2-hydroxy-2-methyl-1-phenylpropane-1-one, benzoyl dimethyl ketone, 4-(2-hydroxy-ethoxy) phenyl-(2-hydroxy-2-propyl) ketone, 2-methyl-2-morpholine (4-thiomethyl phenyl) propane-1-one, 2-benzyl-2-dimethyl amino-1-(4-morpholine phenyl) butanone, 2-hydroxy-2-methyl-1-[4-(1-methylvinyl)phenyl] acetone oligomers, benzoin, methyl benzoin ether, ethyl benzoin ether, isopropyl benzoin ether, isobutylbenzoin ether, benzophenone, methyl o-benzoylbenzoate, 4-phenylbenzophenone, 4-benzoyl-4'-methyl-diphenylthioether, 3,3',4,4'-tetra (tert-butylcarbonyl peroxide)benzophenone, 2,4,6-trimethylbenzophenone, 4-benzoyl-N,N-dimethyl-N-[2-(1-oxo-2-propenoxy) ethyl] benzoylammonium bromide, (4-benzoylbenzyl)trimethylammonium chloride, 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxyl)-3,4-dimethyl-9H-thioxanthone-9-one racemic chloride, diphenyl-(2,4,6-trimethylbenzoyl) phosphine oxide, bis(2,4,6-trimethylbenzoyl)-phenyl phosphine oxide, acylphosphine oxides, etc.

In some specific embodiments, two photoinitiators, such as diphenyl-(2,4,6-trimethylbenzoyl) phosphine oxide and 1-hydroxy-cyclohexyl-phenyl-ketone, are preferably used in the present disclosure in consideration of surface initiation and internal initiation.

In some specific embodiments, in order to make the present disclosure have the best effect, a content of the photoinitiator is from 0.1% to 8%, such as 0.5%, 1%, 2%, 3%, 4%, 5%, 6%, 7%, etc., based on a total mass of the polyurethane (methyl) acrylate of 100%.

Diluent

The composition disclosed herein may optionally comprise a diluent. The diluent is used in the matte resin composition in the present disclosure to increase the fluidity of the matte resin composition. The diluent of the present disclosure will be completely volatilized during the processing, and after volatilizing, the raw material will form a film. Therefore, the matte film of the present disclosure generally does not contain diluent or contains only a small amount of diluent. The diluent of the present disclosure is not specially restricted, and those skilled in the art may make routine choices as required.

The diluent may be listed as one or a combination of two or more of toluene, xylene, tritoluene, ethanol, butyl acetate, etc.

In some specific embodiments, in order to make the present disclosure have the best effect, a content of the diluent is from 5% to 20%, such as 6%, 7%, 8%, 9%, 10%, 11%, 12%, 13%, 14%, 15%, 16%, 17%, 18%, 19%, etc., based on a total mass of the polyurethane (methyl) acrylate of 100%.

Matting Agent

By using a matting agent, the matte resin composition of the disclosure may increase the matte effect, while reduce the fluidity, to make the matte layer resin easier to form a film.

The specific composition of the matting agent disclosed herein is not specially restricted, which may be selected as required. Specifically, the matting agent may be one or a combination of two or more of silica, clay, silicate or derivatives thereof, polytetrafluoroethylene powder, silicone resin powder, wax powder, polyethylene powder, polyamide powder, polymethyl methacrylate (PMMA) powder, talc, silica/$TiO_2$ or silica/zinc oxide composites.

Further, for a clay, the clay of the montmorillonite family may be mentioned, such as one or a combination of two or more of hectorite, kaolinite, dicartinite, pearly clay, polyhydrous kaolinite, phylloserite, modified clay, montmorillonite, badite, vermiculite, talc, magnesite, Li-montmorillonite, saponite, chlorite, sepiolite or illite.

For silica, silica not in the form of colloidal particle dispersion is preferred in the present disclosure. In other words, the silica that may be present in the composition of the present disclosure is one in the form of a dispersion of particles with an average diameter of 1 micron or greater.

In the present disclosure, the silica may comprise one or a combination of two or more of porous silica microspheres, amorphous silica microspheres coated with polydimethylsiloxane; silica microbeads, precipitated silica, etc., In addition, it needs to be noted that a vapor phase silica is not preferably used as the silica disclosed herein.

In the disclosure, in order to make the present disclosure have the best effect, a content of the matting agent is from 0.5% to 3%, such as 0.8%, 1%, 1.2%, 1.5%, 1.8%, 2%, 2.2%, 2.5%, 2.8%, etc., based on a total mass of the polyurethane (methyl) acrylate of 100%.

Corrosive Agent

The matte resin composition disclosed herein optionally contains a corrosive agent. The corrosive agent of the present disclosure is capable of corroding the contact surface to increase the adhesion force between the two layers and facilitating the application of the matte resin composition to the surface of the design layer or the artificial nail body during the process. Due to the presence of the corrosive agent, the contact surface in contact with the design layer or the artificial nail body may be corroded.

The corrosive agent is not specially restricted in the present disclosure, which may be a commonly used corrosive agent in this field. Specifically, the corrosive agent comprises propyl acetate. Propyl acetate is corrosive, and is able to corrode the contact surface when the matte layer is applied to the design layer or the artificial nail body, thus increasing the adhesion between the design layer or the artificial nail and the matte layer.

In the present disclosure, in order to make the present disclosure have the best effect, a content of the corrosive agent is from 0.1% to 1%, such as 0.2%, 0.3%, 0.4%, 0.5%, 0.6%, 0.7%, 0.8%, 0.9%, etc., based on a total mass of the polyurethane (methyl) acrylate of 100%.

Other Components

The matte resin composition of the present disclosure may also contain other components. In addition to the above components, additives such as a filler, a silane coupling agent, a plasticizer, a defoamer, a pigment, a rust inhibitor, a homogenizer, a dispersant, a rheological regulator, a flame retardant and a pigment may be used in the present disclosure to the extent that it does not prejudice the purpose of the present disclosure.

Preparation Method of the Matte Resin Composition

Further, the preparation method of the matte resin compositions is not specifically restricted in the present disclosure and may be a commonly used method in this field. Specifically, the matte resin composition may be obtained by mixing polyurethane (methyl) acrylate with a photoinitiator, a diluent, an optional corrosive agent, an optional acrylic monomer, and other optional components.

In addition, the preparation method of the matte resin composition of the present disclosure is not specifically restricted, and it may be a conventional method such as combining the above components and mixing them at room temperature or an increased temperature by using a mixer, a roller, a kneading machine, etc., or using a small amount of solvent to dissolve the components and then mixing them.

Matte Film

The present disclosure also provides a matte film comprising the matte resin composition according to the present disclosure, and the matte resin composition may be used to form a matte film by coating, such as spraying, casting, etc. After forming the film, it will be cured by ultraviolet light irradiating for 3 to 5 seconds.

<The Second Aspect>

The second aspect of the present disclosure provides an artificial nail comprising a matte layer which is the matte film according to the first aspect of the present disclosure.

Further, as shown in the sole FIGURE, in some specific embodiments, the artificial nail comprises:

- an artificial nail body,
- an optional design layer in contact with the artificial nail body; and
- a matte layer in contact with the design layer or the artificial nail body.

In the present disclosure, the surface of the matte layer may be coated with nail polish, and may also be set with a pattern layer to make the artificial nail more beautiful. Specifically, it may be printed, bronzed, sprayed, printed, electroplated, transferred to make it with patterns.

Specifically, in the present disclosure, the artificial nail body may have color-containing, pearlescent-containing effect, etc. The design layer may have cat eye effect, ink effect or other effects.

Nail polish is painted by consumers themselves and may be a general used nail polish. When consumers do not apply a wear-resistant layer, and the artificial nail is a nail with matte effect, pattern and color of the nail design layer or artificial nail body are not obvious. When consumers apply nail polish, and the coated part turns into a bright light effect, pattern and color of the nail design layer or artificial nail body are more obvious.

The matte layer has an improved adhesion force, making nail polish difficult to fall off and peel. Consumers may finish manicure without polishing and coating an adhesive layer.

EXAMPLE

The embodiments of the present disclosure are described in detail below in conjunction with examples. However, it will be understood by those skilled in the art that the following examples are used only to illustrate the present disclosure and should not be regarded as limiting the scope of the present disclosure. Where the specific conditions are not indicated in the examples, they shall be carried out in accordance with the usual conditions or those recommended by the manufacturer. All reagents or instruments used, where the manufacturer is not indicated, are conventional products that may be obtained through the market.

The present disclosure will be further explained by specific examples as follows:

(Test Method)

1) Matte Degree Test:

The matte degree test was performed by using a glossiness tester at an angle of 60°.

2) Adhesion Force Test:

The adhesion force was tested by a 100-grid test method. The matte resin composition was placed in the grid to film, and then the grid of a certain size was evenly marked on the coating film by the 100-grid knife. The adhesion degree of the coating film to the substrate was evaluated by evaluating the integrity of the coating film in the grid, which was represented by "level". They were assessed according to GBT9286-1998 standard.

Examples 1 to 32

According to the composition and weight of each component given in Table 1 to Table 4, the matte resin compositions were obtained after mixing at room temperature, and then the matte films were obtained after curing by ultraviolet light for 3 to 5 seconds. Then, matte degree test and adhesion force test were conducted, wherein, the lower the matte degree level, the better the performance, and the higher the adhesion force level, the better the performance. The results were shown in Tables 1 to 4 below:

TABLE 1

| Composition | Model | Example 1 | 2 | 3 | 4 | 5 | 6 | 7 | 8 |
|---|---|---|---|---|---|---|---|---|---|
| Polyurethane (methyl) acrylate | B-401 | 15 kg | 15 kg | 15 kg | 15 kg | 15 kg | 15 kg | 15 kg | 15 kg |
| Isobornyl acrylate | IBOA | 0 | 0 | 0 | 0 | 0 | 0 | 0 | 0 |
| Tetrahydrofu-ran acrylate | THFA | 0 | 0 | 0 | 0 | 0 | 0 | 0 | 0 |
| Matting agent | Precip-itated silica | 0 g | 50 g | 100 g | 150 g | 200 g | 250 g | 350 g | 450 g |
| Photo-initiator | TPO | 150 g | 150 g | 150 g | 150 g | 150 g | 150 g | 150 g | 150 g |
| | 184 | 450 g | 450 g | 450 g | 450 g | 450 g | 450 g | 450 g | 450 g |
| Diluent | Xylene | 1.5 kg | 1.5 kg | 1.5 kg | 1.5 kg | 1.5 kg | 1.5 kg | 1.5 kg | 1.5 kg |
| Corrosive agent | Propyl acetate | 80 g | 80 g | 80 g | 80 g | 80 g | 80 g | 80 g | 80 g |
| Matte degree (level) | | 8 | 7 | 5 | 5 | 5 | 4 | 4 | 4 |
| Adhesion force (ASTM Grade) | | 2B | 2B | 2B | 2B | 2B | 2B | 2B | 2B |

TABLE 2

| Composition | Model | Example 9 | 10 | 11 | 12 | 13 | 14 | 15 | 16 |
|---|---|---|---|---|---|---|---|---|---|
| Polyurethane (methyl) acrylate | B-401 | 15 kg | 15 kg | 15 kg | 15 kg | 15 kg | 15 kg | 15 kg | 15 kg |
| Isobornyl acrylate | IBOA | 0 | 0 | 0 | 0 | 0 | 0 | 0 | 0 |
| Tetrahydrofu-ran acrylate | THFA | 0 | 0 | 0 | 0 | 0 | 0 | 0 | 0 |
| Matting agent | Precip-itated silica | 150 g | 150 g | 150 g | 150 g | 150 g | 150 g | 150 g | 150 g |
| Photo-initiator | TPO | 150 g | 150 g | 150 g | 150 g | 150 g | 150 g | 150 g | 150 g |
| | 184 | 450 g | 450 g | 450 g | 450 g | 450 g | 450 g | 450 g | 450 g |
| Diluent | Xylene | 1.5 kg | 1.5 kg | 1.5 kg | 1.5 kg | 1.5 kg | 1.5 kg | 1.5 kg | 1.5 kg |
| Corrosive agent | Propyl acetate | 0 | 50 | 60 | 75 | 80 | 85 | 90 | 95 |
| Matte degree (level) | | 5 | 5 | 5 | 5 | 5 | 5 | 5 | 5 |
| Adhesion force (ASTM Grade) | | 1B | 1B | 1B | 3B | 3B | 3B | 3B | 3B |

TABLE 3

| Component | Model | Example 17 | 18 | 19 | 20 | 21 | 22 | 23 | 24 |
|---|---|---|---|---|---|---|---|---|---|
| Polyurethane (methyl) acrylate | B-401 | 15 kg | 15 kg | 15 kg | 15 kg | 15 kg | 15 kg | 15 kg | 15 kg |
| Isobornyl acrylate | IBOA | 950 g | 1000 g | 1050 g | 1100 g | 1150 g | 1200 g | 1250 g | 1300 g |
| Tetrahydrofu- | THFA | 0 | 0 | 0 | 0 | 0 | 0 | 0 | 0 |

TABLE 3-continued

| Component | Model | Example 17 | 18 | 19 | 20 | 21 | 22 | 23 | 24 |
|---|---|---|---|---|---|---|---|---|---|
| ran acrylate | | | | | | | | | |
| Matting agent | Precipitated silica | 150 g | 150 g | 150 g | 150 g | 150 g | 150 g | 150 g | 150 g |
| Photo-initiator | TPO | 150 g | 150 g | 150 g | 150 g | 150 g | 150 g | 150 g | 150 g |
| | 184 | 450 g | 450 g | 450 g | 450 g | 450 g | 450 g | 450 g | 450 g |
| Diluent | Xylene | 1.5 kg | 1.5 kg | 1.5 kg | 1.5 kg | 1.5 kg | 1.5 kg | 1.5 kg | 1.5 kg |
| Corrosive agent | Propyl acetate | 80 g | 80 g | 80 g | 80 g | 80 g | 80 g | 80 g | 80 g |
| Matte degree (level) | | 5 | 5 | 5 | 5 | 5 | 5 | 5 | 5 |
| Adhesion force (ASTM Grade) | | 3B | 3B | 3B | 4B | 4B | 4B | 4B | 4B |

TABLE 4

| Composition | Model | Example 25 | 26 | 27 | 28 | 29 | 30 | 31 | 32 |
|---|---|---|---|---|---|---|---|---|---|
| Polyurethane (methyl) acrylate | B-401 | 15 kg | 15 kg | 15 kg | 15 kg | 15 kg | 15 kg | 15 kg | 15 kg |
| Isobornyl acrylate | IBOA | 1100 g | 1100 g | 1100 g | 1100 g | 1100 g | 1100 g | 1100 g | 1100 g |
| Tetrahydrofuran acrylate | THFA | 950 g | 1000 g | 1050 g | 1100 g | 1150 g | 1200 g | 1250 g | 1300 g |
| Matting agent | Precipitated silica | 150 g | 150 g | 150 g | 150 g | 150 g | 150 g | 150 g | 150 g |
| Photo-initiator | TPO | 150 g | 150 g | 150 g | 150 g | 150 g | 150 g | 150 g | 150 g |
| | 184 | 450 g | 450 g | 450 g | 450 g | 450 g | 450 g | 450 g | 450 g |
| Diluent | Xylene | 1.5 kg | 1.5 kg | 1.5 kg | 1.5 kg | 1.5 kg | 1.5 kg | 1.5 kg | 1.5 kg |
| Corrosive agent | Propyl acetate | 80 g | 80 g | 80 g | 80 g | 80 g | 80 g | 80 g | 80 g |
| Matte degree (level) | | 5 | 5 | 5 | 5 | 5 | 5 | 5 | 5 |
| Adhesion force (ASTM Grade) | | 4B | 4B | 4B | 5B | 5B | 5B | 5B | 5B |

As can be seen from Tables 1 to 4, the matte film (artificial nail) prepared by the matte resin composition disclosed herein has excellent matte degree and adhesion force.

The above examples of the present disclosure are only examples for the purpose of clearly stating the present disclosure and are not intended to qualify the embodiments of the present disclosure. Persons skilled in the art may also make other different forms of change or variation on the basis of the above description. It is not necessary and cannot be exhaustive of all modes of embodiments. Any modification, equivalent substitution and improvement made in the spirit and principles of the present disclosure shall be covered by the protection scope of claims of the present disclosure.

The invention claimed is:

1. A matte resin composition, consisting of a mixture of the following components:
- a photoinitiator,
- a matting agent,
- an optional diluent,
- an optional corrosive agent,
- an acrylic monomer, and
- polyurethane (methyl) acrylate,
- wherein a monomer of the polyurethane (methyl) acrylate has a functionality between 2 and 6; and the polyurethane (methyl) acrylate has a molecular weight between 1000 and 2000 Da, a viscosity between 290 and 400 cps/30° C. and an acid value of less than 5 mg KOH/g,
- wherein the acrylic monomer is a combination of isobornyl acrylate and tetrahydrofuran acrylate;
- wherein a content of the isobornyl acrylate is 7.3%, and a content of the tetrahydrofuran acrylate is from 6.3% to 8.7%, based on a total mass of the polyurethane (methyl) acrylate of 100%.

2. The matte resin composition according to claim 1, wherein a content of the photoinitiator is from 0.1% to 8%; a content of the matting agent is from 0.5% to 3%; a content of the diluent is from 5% to 20%; a content of the corrosive agent is from 0.1% to 1%, based on a total mass of the polyurethane (methyl) acrylate of 100%.

3. The matte resin composition according to claim 1, wherein a content of the acrylic monomer is from 3% to 25% based on a total mass of the polyurethane (methyl) acrylate of 100%.

4. A preparation method of the matte resin composition according to claim 1, comprising a step of mixing all components of the matte resin composition.

5. A matte film, comprising the matte resin composition according to claim 1.

6. An artificial nail, comprising a matte layer, wherein the matte layer is the matte film according to claim 5.

7. The artificial nail according to claim 6, wherein the artificial nail further comprises:

an artificial nail body, an optional design layer in contact with the artificial nail body; and a matte layer in contact with the design layer or the artificial nail body.

8. A preparation method of the matte resin composition according to claim 2, comprising a step of mixing all components of the matte resin composition.

9. A preparation method of the matte resin composition according to claim 3, comprising a step of mixing all components of the matte resin composition.

* * * * *